(12) United States Patent
Johnson et al.

(10) Patent No.: US 6,448,564 B1
(45) Date of Patent: Sep. 10, 2002

(54) APPARATUS, METHODS, AND SYSTEMS FOR ASSAYING MATERIALS

(75) Inventors: Alfred N. Johnson, Knoxville; Jeffrey W. Dickinson, Kingston; John L. McGehee, Knoxville; David H. Weigle, Philadelphia; Timothy B. Ramsey, Knoxville, all of TN (US)

(73) Assignee: GTSD Sub III, Wilmington, DE (US)

(*) Notice: Subject to any disclaimer, the term of this patent is extended or adjusted under 35 U.S.C. 154(b) by 143 days.

(21) Appl. No.: 09/580,631

(22) Filed: May 30, 2000

(51) Int. Cl.[7] ............................................. G01T 1/167
(52) U.S. Cl. ..................... 250/394; 250/395; 250/369; 250/303
(58) Field of Search ................................ 250/394, 395, 250/369, 303

(56) References Cited

U.S. PATENT DOCUMENTS

| | | |
|---|---|---|
| 3,255,352 A | 6/1966 | Johnston |
| 3,934,147 A | 1/1976 | Platz et al. |
| 3,935,913 A | 2/1976 | Wagner et al. |
| 4,228,864 A | 10/1980 | Berger et al. |
| 4,280,576 A | 7/1981 | Smith, Jr. |
| 4,658,142 A | 4/1987 | Johnson et al. |
| 4,863,638 A | 9/1989 | Harper, III |
| 5,135,706 A | 8/1992 | Costes et al. |
| 5,330,142 A | 7/1994 | Gnau, III |
| 5,444,746 A | 8/1995 | Okamoto et al. |
| 5,635,681 A | 6/1997 | Dean |
| 5,679,956 A | 10/1997 | Johnston |
| 5,705,818 A | 1/1998 | Kelbel et al. |
| 5,866,907 A | * 2/1999 | Drukier et al. ............. 250/394 |

FOREIGN PATENT DOCUMENTS

| | | |
|---|---|---|
| GB | 2 066 453 A | 12/1980 |
| GB | 2 066 456 A | 12/1980 |

OTHER PUBLICATIONS

Walchuk, Mary A., "NRC Proposes Clearance Levels Rule", *The Health Physics Society's Newsletter*, vol. XXVI, No. 12, Dec. 1998, pp. 1,4, and 5.

American National Standards Institute, Inc./Health Physics Society, ANSI/HPS N13.12–1999, "Surface and Volume Radioactivity Standards for Clearance", Aug. 31, 1999, entire document.

* cited by examiner

*Primary Examiner*—Constantine Hannaher
*Assistant Examiner*—Andrew Israel
(74) *Attorney, Agent, or Firm*—Finnegan, Henderson, Farabow, Garrett & Dunner LLP

(57) ABSTRACT

An apparatus, methods, and systems for assaying materials are disclosed using a combination of detectors that scan for areas of material non-uniformity, and assay the type and amount of radioactivity present in the material. Scanning detectors are provided to scan for non-uniform levels of radiation emanating from the material. If any non-uniformity is detected by the scanning detectors, the material non-uniformity is removed and handled with radioactive material protocols. The remaining material may then be subject to assay. If the material shows no signs of non-uniform radiation emission, the assay detectors are used to assay the material. If the concentration of any one or more radionuclides exceeds a predetermined limit, the assayed material is handled with radioactive material protocols. If there are no indications of non-uniformity and all the radionuclides meet the limit, the material is safe for release or clearance from radiological controls (including disposal in a landfill, recycling or other unrestricted uses). A system is also disclosed using a plurality of assay stations.

116 Claims, 4 Drawing Sheets

APPARATUS, METHODS, AND SYSTEMS FOR ASSAYING MATERIALS

BACKGROUND OF THE INVENTION

The present invention relates to bulk assaying systems. More particularly, the present invention relates to apparatus, methods, and systems for assaying materials to detect the types and amounts of radiation.

DESCRIPTION OF RELATED ART

The threat of environmental contamination with radioactively contaminated materials is a growing problem worldwide. As increasing numbers of industries use radiation energy in the course of business, increasing amounts of materials become radioactive and must be handled differently than other industrial waste products which end up in landfills or other raw or reusable materials which are recycled. Government guidelines as set by the Nuclear Regulatory Commission (NRC) and other state and federal regulatory agencies establish maximum acceptable radiation levels for organizations that are licensed to posses solid radioactive materials, to regulate the level of radiation that is released into the environment. The predetermined maximum values for such radioactive guidelines are in terms of total radioactive levels within or on the surface of the solid waste materials per unit weight. If the radiation levels of the materials are above a predetermined maximum regulatory limit, the licensed industry possessing this material is not allowed to release the material for conventional disposal in an ordinary landfill or for reuse/recycling. The parameter measured in determining feasibility of release from licensed controls to landfill disposal is typically based on the overall radiation level emanating from the material per unit weight or per unit surface area.

Thus far, attempts to regulate the amount of radioactive material released into the environment have focused on allowing no detectable amount of radiation in materials to be discarded through conventional landfills or by recycling. Related apparatus, methods, and systems for detecting radioactivity in solid material have only focused on ascertaining whether the materials exceed a general detectable regulated limit of radiation.

The related art, therefore, deals with the overall radiation level in screening or scanning of material to determine if there is presence of radioactivity. As such, the related art is generally in the field of screening/scanning railroad cars and trucks to determine whether cargo carried thereon has any signs of radioactivity. For example, a railroad car carrying metal scraps such as steel scrap on a track may travel through a screening apparatus having detectors on adjacent sides of the track. The detectors only respond to an appropriate level of overall radioactivity. A yes/no response is produced and if the level of radiation is below a predetermined regulatory level (the "no" signal), then the scrap load is considered safe and reused as scrap metal or otherwise released to a landfill. Conversely, if the level of radiation is above a predetermined level (the "yes" signal), even if the signal is produced by a single item in a carload of scrap metal, then the scrap load is considered not safe because it is too radioactive and cannot be released to landfills or reused as scrap metal. These materials must be treated through radioactive material disposal protocols.

However, recent scientific findings and trends show that determining the total level of radiation is not as critical to assessing potential radiation damage to the environment as determining the type of radionuclide producing the radiation and the magnitude and type of radiation produced by that particular radionuclide. In other words, the determination of the type and amount of a specific radionuclide can be much more important than the overall radiation contributed by all materials. In light of recent proposals in the regulatory field, such as ANSI/HPS N13.12-1999 (American National Standards Institute, Inc./Health Physics Society: Surface and Volume Radioactivity Standards for Clearance), to place limits on the release amounts of specific types of radionuclides, the systems in use in the related art will become obsolete. ANSI/HPS N13.12-1999 is a regulatory standard intended to provide guidance for protecting the public and the environment from radiation exposure.

None of the related art makes any attempt to ascertain whether the radiation is equally dispersed throughout a load; what radiation, if any, is caused by what types of radionuclides; and finally, the magnitude of the level of radiation from each radionuclide. Thus, there is a need to create apparatus, methods, and systems that are capable of identifying individual radionuclides potentially present in the solid waste materials and then determining the quantity of each radionuclide, for compliance with recently proposed changes in regulations governing release of residual quantities of radioactivity in solid waste materials to the environment.

SUMMARY OF THE INVENTION

Accordingly, the present invention is directed to an apparatus, methods, and disadvantages of the related art. The present invention is designed to detect individual types of radionuclides and whether the quantity of each radionuclide meets or exceeds a predetermined regulatory limit.

To achieve these and other advantages and in accordance with the purposes of the invention, as embodied and broadly described, the invention includes an apparatus for assaying material comprising a support for holding a device for containing material, a scanning detector proximate the support to detect an area of radioactive non-uniformity in the material, and an assay detector proximate the support to assay radiation emanating from the material.

In accordance with another embodiment of the invention, the invention includes a method for assaying material comprising providing a device for holding or containing material, detecting for an area of radioactive non-uniformity in the material with a scanning detector, and assaying any radiation emanating from the material with an assay detector.

In accordance with another embodiment of the invention, the invention includes a system for assaying material comprising a support for holding a device containing material, an assay station including a scanning detector proximate the support to detect an area of radioactive non-uniformity in the material, and an assay detector proximate the support to assay any radiation emanating from the material, The system also includes means for delivering the device to the assay station, and means for removing the device from the assay station.

Additional features and advantages of the invention will be set forth in the description which follows, and in part will be apparent from the description, or may be learned by practice of the invention. The objectives and other advantages of the invention will be realized and attained by the apparatus, methods, and systems particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate preferred embodiments of the invention and, together with the description, serve to explain the objects, advantages, and principles of the invention. In the drawings.

DETAILED DESCRIPTION OF PREFERRED EMBODIMENTS

Figure 1:
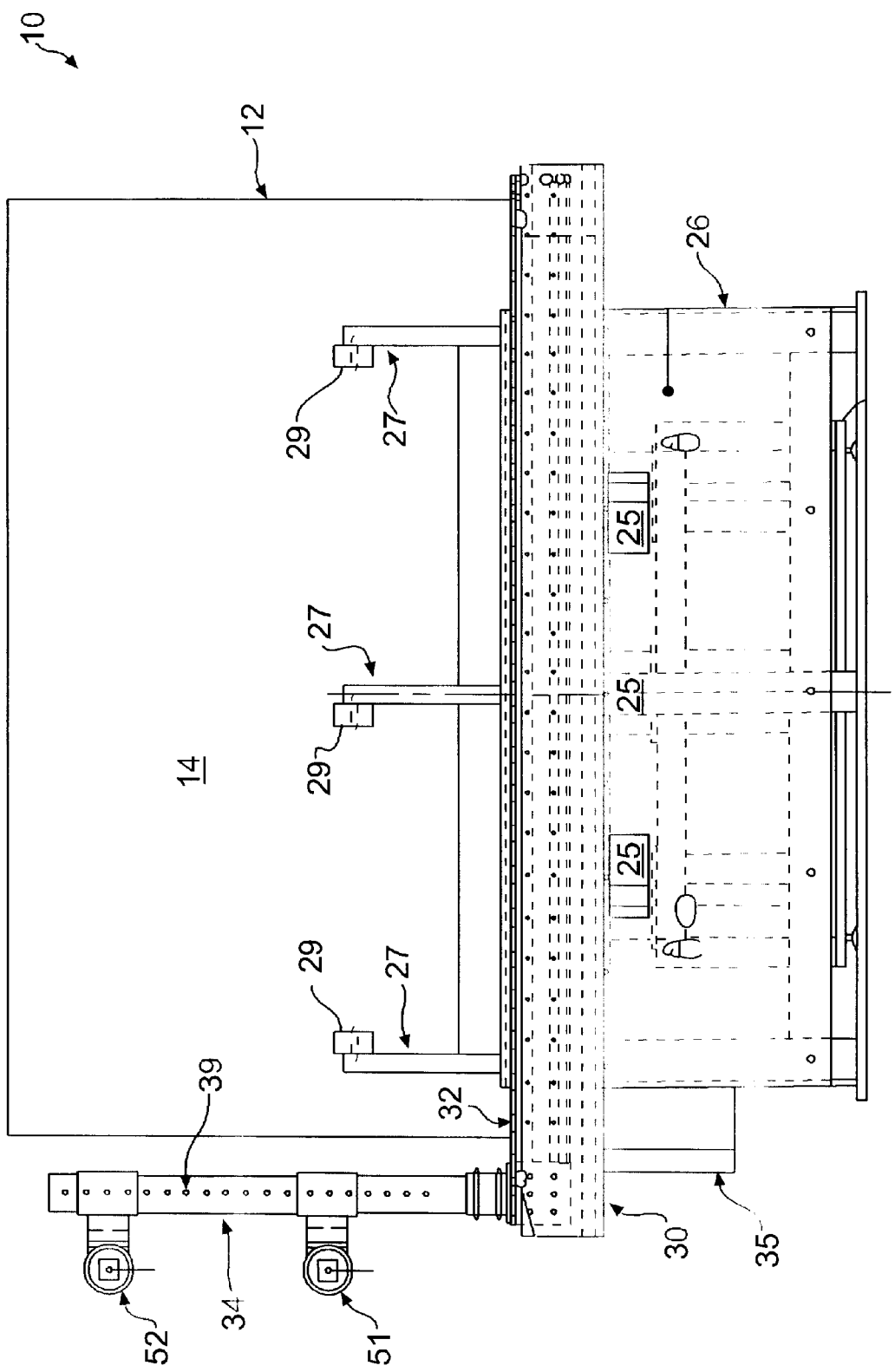
FIG. 1 is a side view of a material assay apparatus according to an embodiment of the present invention.

The present invention is designed to promote compliance with recently proposed specific radionuclide release limits emitted to the environment. Individual limits vary between different radionuclides. ANSI/HPS N13.12 was released late in 1999 and contains a set of radionuclide-specific proposed limits for unconditional release into the environment. The present invention is designed to comply with the new guidelines in an economic and efficient manner. The invention, however, is not limited to compliance with the guidelines, and more broadly relates to apparatus, methods, and systems, that determine whether quantities of individual radionuclides fall within predetermined limits.

The present invention measures any radiation released by a material by ascertaining the type of radionuclide producing the radiation and furthermore by quantifying the amount of each type of radionuclide in the given material by detecting its emissions. An advantage of the present invention over the prior art is its combination of detectors which both ascertain the homogenous nature of the material and determine the sources of the radiation. An operator assaying radioactive material using the present invention obtains a detailed analysis of the types and amounts of radionuclides present in a contaminated material.

Another advantage of apparatus, methods, and systems according to this invention is the ability to distinguish between radiations from naturally occurring and man-made radionuclides. Thus, it is possible to distinguish the two types of radiation to quantify each and determine whether controllable, man-made radionuclides are in compliance with their regulated levels. The related art is limited by only being able to view the total resultant radiation from both man-made and naturally occurring radionuclides. Because the man-made type of radiation release often is the target of strict regulations, the ability to distinguish the two types of radiation allows the radiation material handling entity to determine if the man-made (rather than total) radiation release produced by the man-made radionuclides is compliant with established standards. The ability to distinguish between these two types of radiation saves the radiation material testing facility from having to treat a given material load as unsafe because of the total radiation reading when the given material should be considered safe because it has an acceptable level of radiation from man-made radionuclides despite a relatively high level of naturally occurring radionuclides. Naturally occurring radionuclides typically are either not subject to regulatory control or not held to the same strict regulatory scrutiny as are man-made radionuclides. The present invention is capable of separating out the two classes of man-made and naturally-occurring radiation by quantifying the members of the two classes.

The present invention further establishes a highly reliable method of measuring for radiation in an economic way. This inventive method and system is more reliable and more economic than other related art by its ability to assay materials without concern as to the type of containers holding the waste materials. The method of the present invention is designed to assay materials contained in a variety of different shaped containers, which makes the methods and systems of the present invention more adaptable in assaying materials from different industries, including any that possess radioactive material licenses; such as nuclear power utilities, universities, testing facilities, laboratories, hospitals, Department of Defense, Department of Energy, and any other users of radioactive materials which have to maintain control over release of potentially radioactive materials in their possession. The present methods and systems of the invention are flexible and permit the assay of waste materials from any or all of the applicable industries packaged in a variety of different containers or transport devices with minimum handling by an operator.

Furthermore, the system of the present invention is modular and therefore is readily movable without substantial burden, yet sturdy enough to be able to handle high density materials such as soil, concrete, and metals.

Reference will now be made in detail to the present preferred embodiments of the invention, examples of which are illustrated in the accompanying drawings.

Figure 2:
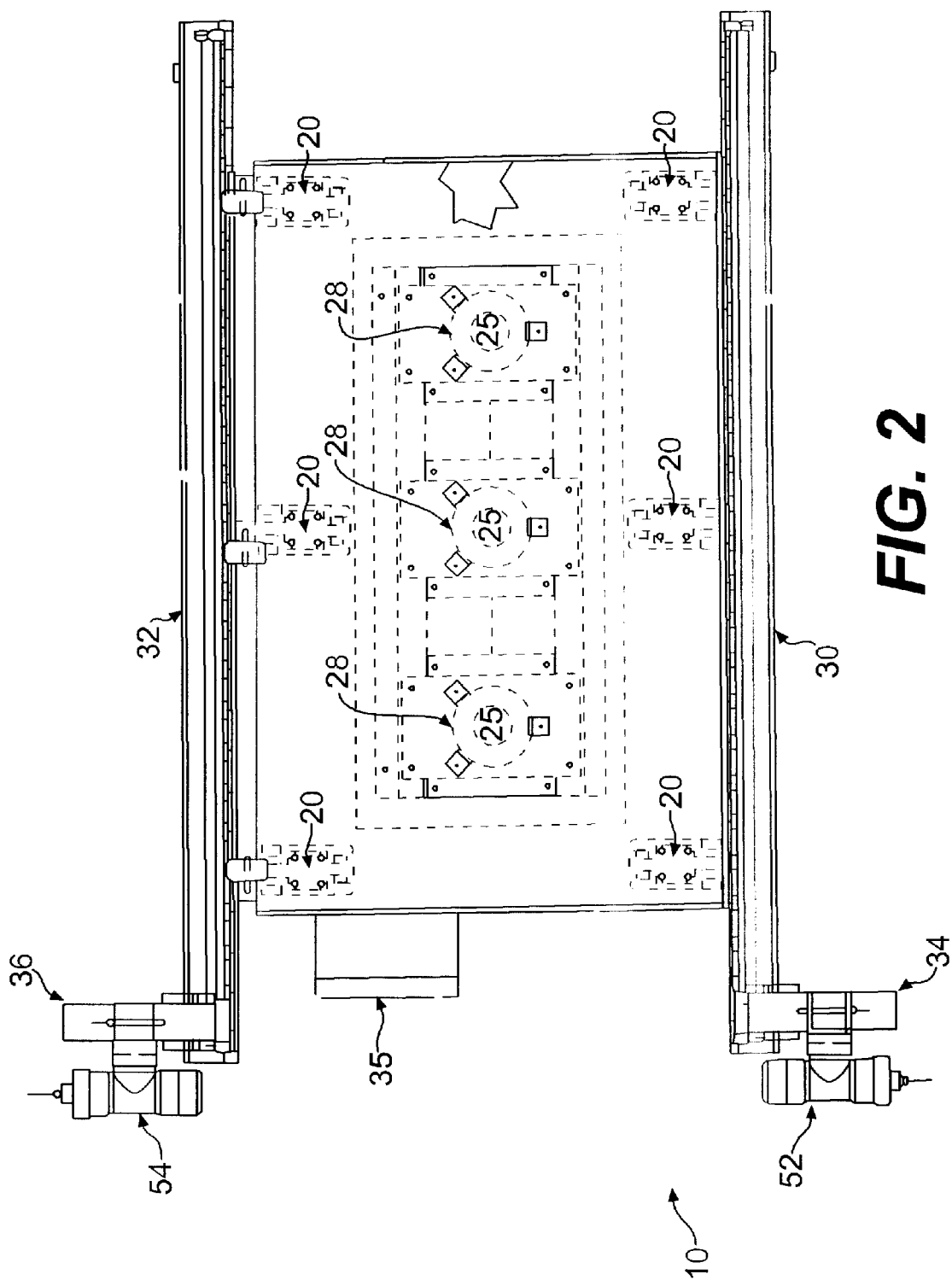
FIG. 2 is a top view of the material assay apparatus of FIG. 1.
Figure 3:
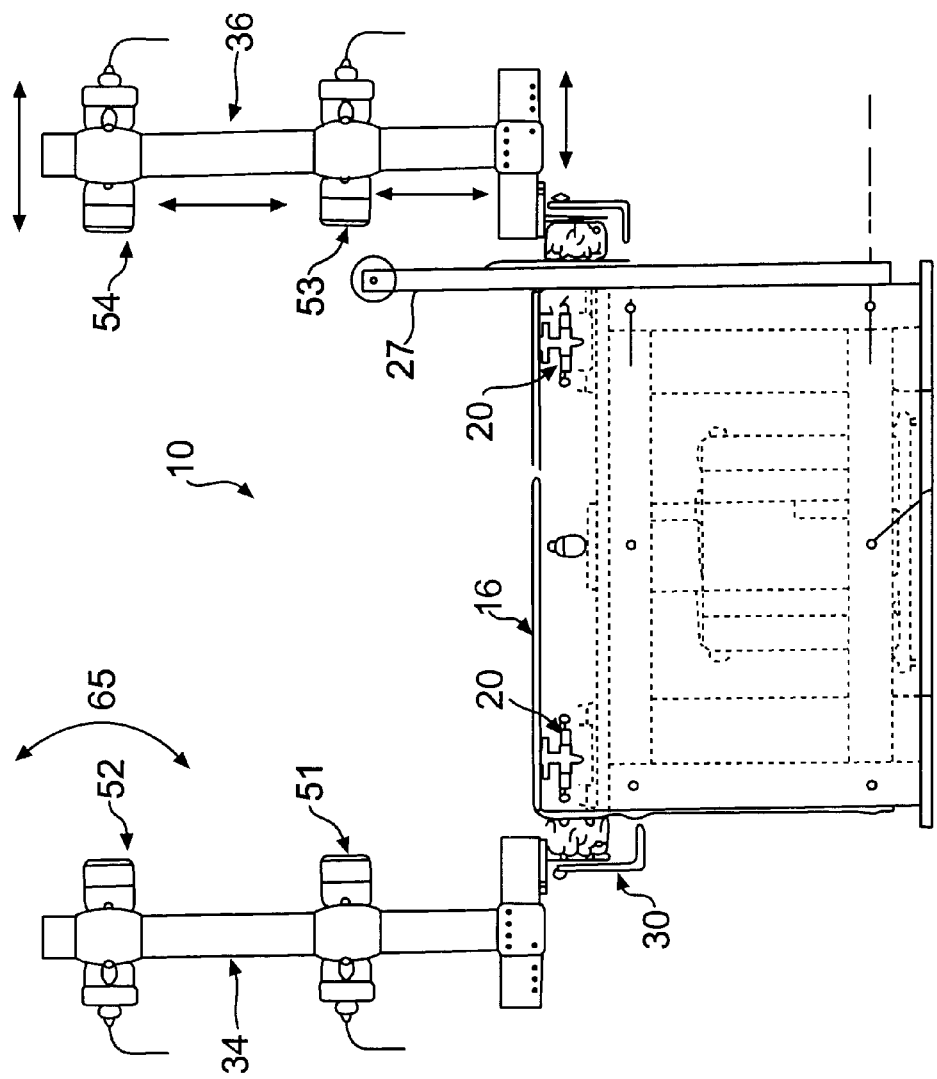
FIG. 3 is an end view of the material assay apparatus of FIG. 1.

An exemplary embodiment of the material assay of the paresent invention is shown in FIGS. 1–3 and is designated generally by reference numeral 10. As embodied herin and referring to FIGS. 1–3, the inventive apparatus 10 utilizes two types of detectors, scanning detectors 51–54 and assay detectors 25, both types powered by AC/DC power sources (not shown). The positioning of the scanning detectors 51–54 and assay detectors 25 optimize their functions and characteristics in this invention. The scanning detectors 51–54 exemplified herein are radiation measurement devices that have the capability of measuring whether radiation is present or not. Such scanning detectors are highly sensitive to radiation and are ideal for measuring for "hot spots," as further discussed below. In contrast, the assay detectors 25, alternatively referred to as "radiation deciphering" detectors, exemplified herein are quantitative radiation assaying devices in that they have the ability to ascertain the energy spectrum produced by a measured amount of radiation into its component parts in terms of what radionuclides are emitting the measured radiation and in what amounts. The assay detectors 25 are typically much more expensive and need a much longer period of time to measure radiation than do the scanning detectors 51–54. Furthermore, the assay detectors 25 must be stationary during radiation detection while the scanning detectors 51–54 can detect radiation while in motion, as when the mobile posts 34, 36 holding detectors 51–54 slide along the horizontal rail slide systems 30, 32, as discussed below. Both scanning detectors 51–54 and assay detectors 25 measure gamma radiation, although the scanning detectors check whether gamma radiation exists or not, and the assay detectors 25 specifically assay the gamma radiation by ascertaining the energy spectrum produced by its component parts. The interaction of the scanning detectors 51–54 and assay detectors 25 will be further discussed below.

The material inventive apparatus 10 includes a device 12 used for containing material 14. The device 12 may be able to support material as well. The device 12 may be a container such as a metallic, plastic, or fiber box, cloth or plastic bag, drum, pallet, tube, tub, or any other item which is capable of containing or supporting potentially radioactive materials. The embodiments shown in the figures utilize a box for sake of simplicity, but it should be recognized that other devices in lieu of the box may be utilized.

The device 12 is placed on a rigid open platform grating 16. The grating is any suitable metal or plastic but must be of open design to allow one or more assay detectors 25 to have unobstructed visual access to the lower wall of the device 12 containing or holding material 14. Material 14 is any potentially radioactive bulk material such as scrap metals, hospital wastes, manufacturing byproduct waste, waste from pharmaceutical industries, or other materials that may have been exposed to radiation. A protective cover (not shown) is optionally placed on the grating 16 to protect the grating and any detectors below, such as assay detectors 25, from any material which could spill from or off the device 12 and fall through and damage the detectors. The cover is typically plastic, Lexan, or other materials which are transparent to light and radiation and which will not affect the ability of the detectors 25 to assay material.

Supporting the grating 16 is a weight measurement scale. In a preferred embodiment, the weight measurement scale is a plurality of load cells 20, for example the Fairbanks 9104 Series Weighing Assembly incorporating Model LCF-3020-3 load cells, generally supporting the periphery of the grating 16. The load cells 20 are connected, typically by wiring (not shown), to a computer (not shown), and serve to determine the weight of objects placed on the grating 16. Although not shown in the figures, the load cells 20 preferably are hard-wired to a Summing Junction Box (Sensortronics Model 20034-6) located in a housing 26, which is then preferably hard-wired to an electronic Weight Indicator (such as, for example, Fairbanks Datasource Indicator Model 90-9201-2), which is then preferably hard-wired to the computer. The number of load cells 20 used generally depends on the size of the platform grating 16 and the overall weight to be measured. A remote control panel (discussed below), computer, Weight Indicator, and radiation analyzer are typically located in a control room, but other configurations and techniques could be employed to determine the weight and properties of the material.

The load cells 20 are attached to the top portion of a housing 26 with suitable adhesive or connectors. The housing 26 is made of a durable material such as carbon steel or any other material that is capable of withstanding heavy weights placed thereon and protecting the assay detectors 25 from side impacts. Box stops 27 with rollers 29 provide guides to control the preferred position of a device 12 in the inventive apparatus 10, and comprise in a preferred embodiment, when using a box for the material 14, a vertical member 27 with a roller 29 at the top of the vertical member to allow the device 12 (e.g., box) to move on the roller without having the friction of the roller affect the weight of the device 12. Additional housing reinforcement structures may be placed interior or exterior to the housing to strengthen the housing structure. The housing 26 is accessible with doors or other opening walls (not shown) allowing easy access to the interior of the housing for repairs or replacement of parts such as the assay detectors 25 and load cells 20.

The housing 26 holds one or more assay detectors 25 that detect and quantify radiation emanating from the bulk material 14. The assay detectors 25 are preferably germanium (Ge) detectors, and more preferably high purity germanium detectors (HPGe), such as, for example, Canberra model GC2020. Other detectors may be used, such as germanium-lithium or other solid state high resolution detectors, so long as they are capable of quantitatively measuring radiation and assaying the resultant detected radiation measurement. The assay detectors 25 are used to assay types of radionuclides producing the radiation signals from the bulk material 14, and quantify how much radiation each type of radionuclide is producing. Although the embodiments in the figures show the assay detectors 25 positioned below the device 12 containing material 14, the assay detectors 25 may be positioned anywhere along the outside surface of the device 12, but generally and preferably should be as close as possible to minimize the time to obtain accurate readings from the material 14, preferably less than about 12 inches. However, some of the factors that determine the distance between the assay detectors 25 and the outside surface of the device 12 are background radiation level, the number of detectors, the size of the device, the number of radionuclides to be detected, and space concerns.

The assay detectors 25 generally may require a liquid nitrogen cooling system (not shown) to maintain the temperature of the detectors at an optimal functioning temperature of preferably about 90 to 105 Kelvin, with a liquid nitrogen temperature of about 77 Kelvin. Furthermore, as shown in FIG. 2, an insulated wall 28 is used to surround the assay detectors 25 and prevent other sources of radiation other than those from the material 14 from affecting the assay detector 25 readings. The assay detectors 25 are connected to the computer (not shown), typically by suitable wiring (not shown). Typically, a gamma spectroscopy software package, such as the Canberra Industries Genie-PC/GWAS software, is used which has a library of radionuclides and radionuclide delays which compares the measured signals with the library to determine the presence of specific radionuclides. The software program should typically be able to perform peak searches (i.e., reviews a collected spectrum to determine the gamma energies detected), identify the particular radionuclide by comparison of the detected gamma energies to a library listing various energies associated with different gamma emitters, and determine the activity concentration of the detected gamma emitter (i.e., computes the concentration of the gamma emitter based on the number of detections per unit time and mass of material sample).

Other components typically used with assay detectors (not shown) include a high voltage power supply, a pre-amp, an A/D converter, and a container for the liquid nitrogen. The embodiments shown herein have three assay detectors 25 but any number of assay detectors is possible. Ideally, the number of assay detectors 25 would be selected by balancing the requisite assay sensitivity demanded by regulatory standards or other standards or limits with the number that is economically feasible for the project.

One advantage of the inventive apparatus 10 is that it is capable of assaying radiation from material 14 handled by a large variety of unusually shaped devices 12. The assay detectors 25 are capable of being moved into position adjacent to the surface of any unusual device 12 containing or supporting a material 14 to be assayed. Moreover, an advantage of having the assay detectors 25 in the preferred position below the material 14 is that the assay detectors are stationary, are not handled (preventing accidental or long-term damage from repeated contact), and the distance from the assay detectors 25 to the material 14 becomes substantially constant (preferably less than about 2 inches, depending on, for example, the detector). Also, with the assay detectors 25 positioned below the potentially radioactive material 14, there is no need for further machinery or manual labor to bring the assay detectors into close proximity with the surface of a device 12 holding material 14. With the assay detectors 25 positioned at a substantially constant distance from any device 12 placed on the system 10, there is also no need to further account for attenuation of measured signal from detectors resulting from dead space distance from a source of material. In this invention, the assay detectors 25 are always approximately the same distance from the material 14 placed in the system so this invention does not suffer from the attenuation of signal from distance between a material 14 and the assay detectors 25. Variations from the preferred distance may not appreciably affect the measurements, depending on the precision of the assay detectors, for example.

On both sides of the device 12, horizontally-disposed rail slide systems 30 and 32 enable respective mobile posts 34 and 36 to slide horizontally thereon along the device 12. Typically, one or more scanning detectors 51–54 rest on each of the mobile posts 34 and 36, although only one mobile post having only one scanning detector may also be used to scan a device 12. The scanning detectors 51–54 are preferably sodium iodide (NaI) detectors such as Eberline 2 inch by 2 inch NaI(TI). But other replacements for NaI are also possible, such as Geiger-Mueller (GM) detectors or other typical ion-chamber gas filled detectors, or detectors which have general radiation sensing capabilities.

The embodiments shown herein have four scanning detectors 51–54 but any number of scanning detectors is possible. Additional rail slide systems may also be used. Preferably, the number of scanning detectors 51–54, mobile posts 34, 36, and slide systems 30, 32 would be selected by balancing the requisite radiation detection accuracy demanded, the size of the device that is being scanned, and the number that is economically feasible.

Preferably, the rail slide systems 30 and 32 are horizontally disposed on the sides of the device 12 as shown in the figures, but they may also be positioned along the top of the device 12 away from the housing 26 or other places where the scanning detectors 51–54 are able to scan the surface of the device 12 during motion. The rail slide systems 30, 32 may also be placed vertically. The control means to induce motion of mobile posts 34, 36 to slide on the slide rail systems 30, 32 preferably is by either a local or remote hard-wired control panel (not shown), separate from the computer. The motion may also be controlled by the computer, from local or remote controls using telemetry (radio frequency, infrared, etc.), or various other techniques and/or configurations. The driving means for the mobile posts 34, 36 to move on slide rails 30, 32 preferably is through a pneumatic system 35, but other drive systems and configurations including electromechanical, hydraulic, and manual, may also be used.

The purpose of the scanning detectors 51–54 is to detect whether any material 14 has non-uniform radiation emissions or a hot spot. Non-uniformity in the material causes different levels of radiation to be emitted. "Hot spots" are generally defined as concentrated areas of higher radiation emission. In this invention, the terms "hot spots" and "non-uniformity" may be used interchangeably. Materials containing "hot spots" are typically handled by radioactive waste processing or waste sorting techniques to remove and properly treat the hot spots. The remainder of the materials can then be assayed or disposed of using normal procedures such as landfills. Materials that display no significant differences between compared sets of scanning detectors 51–54 signify that there is no non-uniformity or hot spots within the material 14 (described further below). That material can then be assayed to determine its overall radiation reading as measured by the assay detectors 25. In other words, the radiation reading by the assay detectors 25 is then presumed to be substantially constant for the entire volume of material 14 in device 12. If the assayed radiation measured by assay detectors 25 signifies that the material 14 is too radioactive for disposal in landfills, it then is handled following standard radiation control protocols. Thus, if there are any hot spots or any assayed radionuclides exceeding a regulatory or other predetermined limit, then the material is typically handled by radiation protocols and cannot be dumped in a landfill or recycled.

Devices 12 having different sizes and shapes may require positional adjustments to the scanning detectors 51–54 to ensure acceptable readings by each dector. For example, with a 4'×4' box (width×height; length of box is ignored because the scanners slide down the slide rail system 30, 32 for the length of the box), each set of scanning detectors, such as 51, and 52, or 53 and 54, is on on defferent mobile posts 34, 36, which preferably have about 5 feet of horizontal separation. Each scanning detector is also about 6" from the side of the 4" wide box. The vertical separation between scanning detectors on the same mobile post preferably is about 2 feet (i.e., at positions 1 foot and 3 foot along a 4 feet tall box) such that each scanning detector will scan about one half of the material in the box. The scanning detectors are positioned with respect to the surface of any device 12 so that each scanning detector has a substantially equal device 12 surface area to scan during the mobile posts' linear, horizontal motion along the length of the device 12. A smaller box than the 4'×4' described will require the acanning detectors to be placed closer together or fewer scanning detectors be used so that each scanning detecot will have a smaller surface area to scan during its linear motion across the length of the box. Likewise, a larger box will require the scanning detectors to be placed further apart or that more scanning detectors be used during the scanning.

The scanning detectors 51–54 preferably are movable. For example, when an unusually shaped device 12 is placed in the assay system, the operator can adjust the scanning detectors' height and inclination on the device to permit scanning of substantially all of the surface of the device. Thus, the scanning detector may be lowered or raised to a desired height along notches 39 as shown in FIG. 1 and further angled as shown by arrow 65 in FIG. 3 so that the detector will be in better position to read the surface radiation emanating from a device 12 upon scanning. The movement and inclination of the scanning detectors 51–54 may be manual, servo-control, pneumatic, or other mechano-control.

Each scanner 51, 52, 53, 54 preferably is connected, typically by wiring (not shown), via an alarm-generating Radiation Analyzer (Aptec Instruments Ltd. TO-Dual OmniTrak) located in the Control Room (not shown) to a computer that compares the measured level of radiation detected by each scanning detector. In other words, each of the scanning detectors 51–54 is used to determine whether the measured magnitude of radiation emanating from any given spot in the material is significantly different from the measured value from any other spot measured by the other scanning detectors. Tolerable differences in measured radiation can be programmed into the relevant software to permit minor acceptable differences of measured radiation between scanners without declaring a hot spot. Such differences are typically factors of about two to ten, generally depending on the operator's specific provisions within its regulatory license to operate. If any two scanning detectors detect magnitudes of radiation which generally differ by more than the prescribed amount (i.e., the tolerable difference), then a "hot spot" is declared and the material is handled as detailed above. For example, in a scan of a given material 14, the reading from scanner 51 is compared to the readings from scanner 52 and readings from scanner 53 and readings from scanner 54. If there is any difference (outside the tolerable difference) between the readings of 51 to 52, or 51 to 53, or 51 to 54, then a signal or an audio and/or visual alarm is sounded signifying a "hot spot" of concentrated radioactive material. Thus, not only are vertical positions of the same side of a given material compared, but also different sides of the material are compared. The given material must produce readings within the tolerable limit in all of the scanning detectors scanning the material in order for the material to be deemed "homogenous" and lacking hot spots or non-uniformity.

Figure 4:
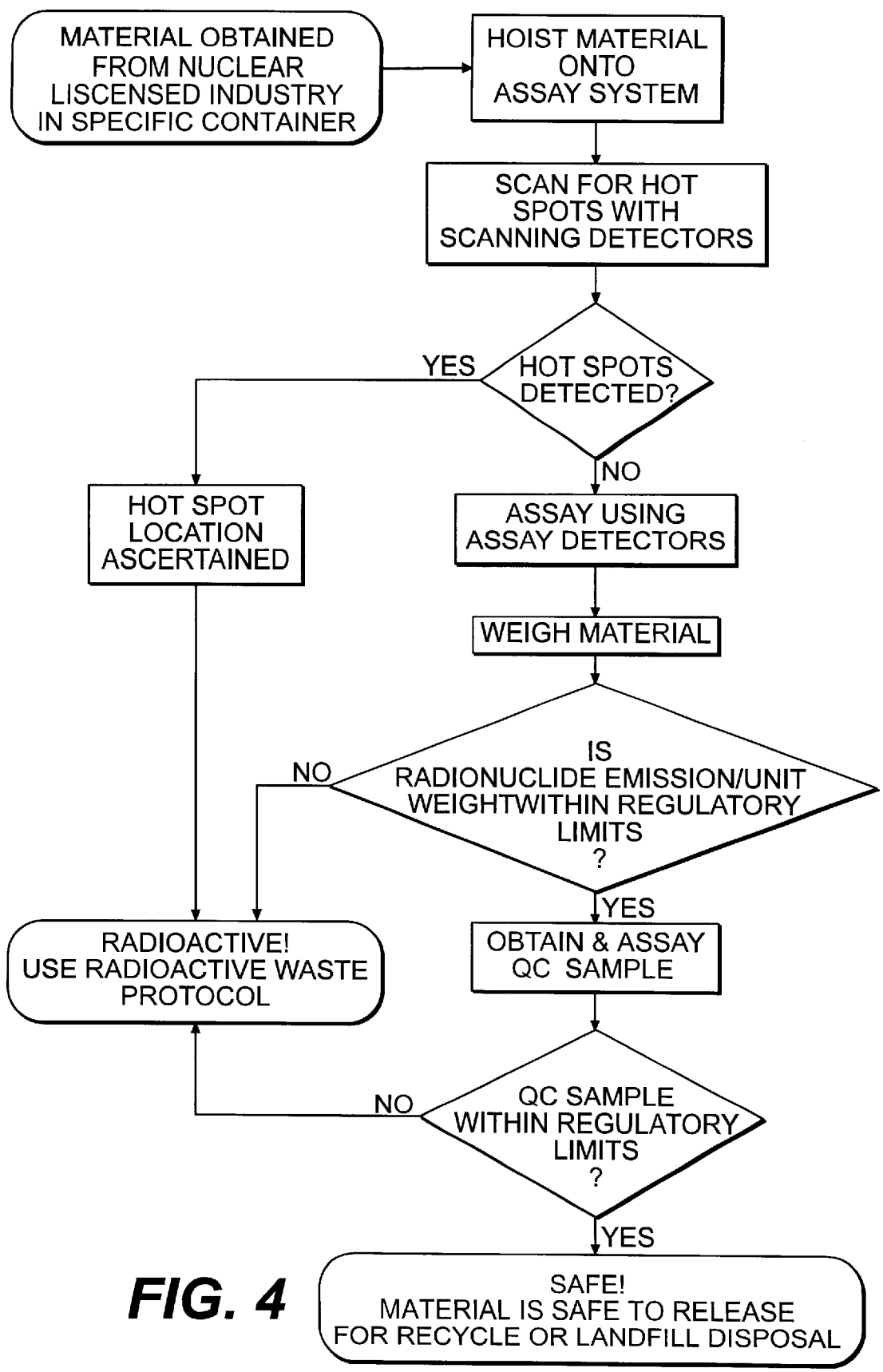
FIG. 4 is a flow diagram of a method for scanning and assaying materials, according to an embodiment of the present invention.

A preferred method of operation of the inventive apparatus 10 as outlined in the block diagram in FIG. 4 will now be described. Although the method will be described with the operation of the scanning detectors taking place prior to the operation of the assay detectors, the assay detectors may be operated before the scanning detectors, or the two types of detectors may be operated simultaneously. Preferably the scanning detectors will be used first to detect the presence of "hot spots" as described above. This technique is preferred because the presence of a hot spot should be handled first before further processing (e.g., assaying) can take place. However, both types of detectors may be operated at the same time, for example, to decrease time of processing for a given material 14. Or, the assay detectors 25 may be operated first to obtain an assay before the material 14 is scanned for non-uniformity with the scanning detectors 51–54.

Operation begins by first depositing a device 12 with material 14 from a source on the grating 16. The device 12 is typically heavy and must be deposited on top of the grating 16 of the inventive apparatus 10 by a fork lift, overhead hoist, conveyor, or other heavy object transporting means. The system 10 and its individual components should be capable of withstanding at least 10,000 pounds or 100 square feet of material to be assayed. After the device 12 with material 14 is placed on the grating 16, the scanning detectors 51–54 are positioned on their corresponding posts 34, 36 so that each scanner will scan approximately the same amount of surface area of the material 14 in the device 12. Each scanner 51–54 can be displaced in a vertical direction on each mobile post 34, 36 and once locked at a given vertical height, can be further inclined up or down to conform to unusually shaped devices 12.

After the scanner adjustment, the scanning detectors 51–54 are activated and operate by scanning the surface of the device 12 as the mobile posts 34, 36 travel along the horizontal slide rails 30, 32. Any radiation signals detected by the scanning detectors 51–54 are transmitted by wire or otherwise to the computer so that all the values measured by the scanning detectors may be compared. If the computer determines that any one scanner signal is different or outside the acceptable tolerance from any other, then a signal, such as an audio and/or visual signal, alerts the operator that there is non-uniformly-dispersed radioactive material 14 within the device 12. This alarm signal indicates the existence of at least one hot spot, and immediately stops the scanner 51–54 travel which indicates the location of the hot spot. At this point, the operator identifies and marks the hot spot area for future reference and handling. Upon completion of the scanning, the device 12 having a hot spot is then separated from other devices and the hot spot area(s) is treated (i.e., removed) following standard protocol. The remainder of the material, now uniform, may be assayed for further processing with specific radiation contamination protocol.

If the scanning detectors 51–54 detect no appreciable differences in radiation, then there are no hot spots and any radiation emanating from the material is considered relatively homogenous throughout the material 14. The operator then initiates the assay detectors 25 to assay the type and magnitude of radiation emanating from the material 14. The resultant assay is displayed and stored on the computer. The assay is weight adjusted according to the material weight measured by the load cells 20. The computer compares the weight-adjusted magnitudes of each radionuclide activity detected to a predetermined magnitude established by regulatory, industry, or other guidelines. If any of the radionuclide weight-adjusted radiation magnitudes exceeds the predetermined allowable radiation magnitude, then a signal such as an audio and/or visual alarm signals the operator that the material 14 is not safe to dispose in a landfill or recycle and therefore must be disposed of in conformance with radiation waste protocols.

When the device 12 transporting material 14 is measured for homogeneity by the scanning detectors 51–54 and assayed with assay detectors 25 and meets the criteria specified for safe disposal, a final quality control step may be performed. A small sample of the material 14 is removed from the device 12 and is assayed separately as an additional quality control test. The quality control (QC) sample is generally taken from the top of the device 12, furthest away from the assay detectors 25, and taken to a laboratory having an assay system, such as EG&G Ortec Model 919 with EG&G's Gamma Vision software, able to assay radiation from small containers.

Generally, if there is any radioactivity in the material 14 not accurately measured by the assay detectors 25 when they are below the device 12, it most likely is at the very top of the material in the device 12 or furthest away from the assay detectors 25. The QC sample is used to confirm the measurements of the assay detectors 25 and the "safe" labeling of the material 14.

The quality control sample confirms the accurate functioning of the assay system to ensure that the scanning (scanning detectors 51–54) and quantitative (assay detectors 25) components are working properly. Also, the quality control sample serves to validate scaling if there are other radionuclides present and determine whether the non-gamma emitting radionuclides are also within the limits set by the standards. As used herein, the term "scaling" is defined as a report of the types and percentages of radiation (alpha, beta, gamma) expected from a given material. Because the scanning detectors 51–54 and assay detectors 25 only measure gamma radiation released by the material 14, other types of radiation (alpha, beta) are not detected. However, scaling is used to quantify the relative amounts of alpha, beta, and gamma radiation emitted by various radionuclides. Because the industries that produce the material 14 typically provide a scaling sheet along with the material 14, which lists each type of radiation or radionuclide the material contains, the inventive apparatus 10 need only measure the levels of emitted gamma radiation to determine what the other radiation magnitudes are through a basic scaling calculation. The computer may be programmed to determine the total radiation levels of each type of alpha, beta, and gamma radiation by measuring emitted gamma radiation and utilizing a scaling factor characteristic of the material 14 being evaluated.

The inventive apparatus 10 can be incorporated into a general radiation testing center. In the testing center, material 14 packaged in devices 12 are brought in from their source and transported, for example by forklifts or overhead hoists, to either of a plurality of assay stations as a function of the size, weight, and density of the material. After scanning and assay by any one of the stations as described above, the device 12 is transported to either a "safe" exit area of the testing center or a "radioactive" exit area of the test center for proper removal and handling from the test center by appropriate transportation. The testing center may be further automated by a conveyor system which receives devices at one end of the test center and runs the devices through the test center as a function of the size and weight of the device as measured by automated sensing instruments or bar codes from the devices, and then delivers them to either the "safe" or "radioactive" exit depending on the readings from the assay systems.

Although the invention has been described with the preferred embodiments shown, other embodiments are also within the teaching of this invention. For example, wiring may be completely replaced with a remote signal system such as optical fiber or radio frequency telemetry. Furthermore, the computer may be made integral with the housing 26. Any number of scanning detectors 51–54 and assay detectors 25 are possible as long as they serve to function as described above. The scanning detectors may be stationary and the device may be moved with respect to the scanning detectors. Although the described invention teaches that scanning detectors 51–54 and assay detectors 25 measure gamma radiation, they could be replaced with instruments capable of detecting and/or measuring other forms of ionizing radiation. These and other changes to the system described are possible without detracting from the teachings disclosed herein.

We claim:

1. An apparatus for assaying material comprising:
   a support for holding a device for containing material;
   a scanning detector proximate to the support and configured to detect an area of radioactive non-uniformity in the material; and
   an assay detector proximate to the support and configured to assay radiation emanating from the area of radioactive non-uniformity in the material detected by the scanning detector.

2. The apparatus of claim 1, wherein the scanning detector is mobile relative to the device and the assay detector is stationary relative to the device.

3. The apparatus of claim 1, further comprising a scale to weigh the device and material.

4. The apparatus of claim 3, further comprising:
   a signal device for signaling that a predetermined radiation level has been reached.

5. The apparatus of claim 3, wherein the assay detector is configured to adjust the assay of the radiation based on the weight of the device and the material measured by the scale.

6. The apparatus of claim 3, wherein the assay detector is configured to identify at least one of a plurality of different types of radiation emanating from the material, identify one of a plurality of different limits based on the identified type of radiation, and determine whether the identified type of radiation exceeds the identified limit.

7. The apparatus of claim 6 wherein the plurality of different types of radiation include a naturally occurring radio-nuclide having a first limit and a man-made radio-nuclide having a second limit.

8. The apparatus of claim 7, wherein the second limit is lower than the first limit.

9. The apparatus of claim 7, wherein the first limit is lower than the second limit.

10. The apparatus of claim 1, wherein the device is a box, a pallet, a drum, a tub, or a bag.

11. The apparatus of claim 1, wherein the device is capable of containing at least 100 ft$^3$ of material.

12. The apparatus of claim 1, wherein the assay detector is a germanium detector.

13. The apparatus of claim 1, wherein the scanning detector is a NaI detector.

14. The apparatus of claim 13, wherein the assay detector is a germanium detector.

15. The apparatus of claim 1, wherein the scanning detector is mounted on a mobile post slidably engaged in a rail slide system.

16. The apparatus of claim 1, wherein the scanning detector comprises a plurality of scanning detectors.

17. The apparatus of claim 16, wherein the plurality of scanning detectors are movable relative to each other.

18. The apparatus of claim 1, wherein the assay detector comprises a plurality of assay detectors.

19. The apparatus of claim 1, wherein the assay detector is configured to identify one of a plurality of different radio-nuclides associated with the radiation emanating from the area of radioactive non-uniformity in the material, and quantify an amount of radioactivity present due to the identified radio-nuclide.

20. The apparatus of claim 1, wherein the assay detector is configured to analyze an energy spectrum associated with the radiation emanating from the area of radioactive non-uniformity so as to identify one of a plurality of different radio-nuclides.

21. The apparatus of claim 19, wherein the plurality of different types of radio-nuclides include naturally occurring and/or man-made radio-nuclides.

22. The apparatus of claim 19, further comprising a comparing device configured to compare the amount of radiation generated by the identified radio-nuclide with a limit associated with the identified radio-nuclide.

23. The apparatus of claim 22, wherein the comparing device is configured to determine whether the amount of radiation generated by the identified radio-nuclide exceeds the limit associated with the identified radio-nuclide.

24. The apparatus of claim 1, wherein the scanning detector is arranged to scan a side surface of the device, and the assay detector is arranged to assay radiation emanating from a bottom surface of the device.

25. The apparatus of claim 1, wherein the assay detector is arranged to assay radiation emanating from only a single side of the device.

26. The apparatus of claim 1, wherein the assay detector is arranged to assay radiation emanating from the material while the material moves relative to the support.

27. The apparatus of claim 1, wherein the assay detector is configured to identify at least one of a plurality of different radio-nuclides associated with the radiation from the area of radioactive non-uniformity, identify a magnitude of radiation associated with each identified radio-nuclide associated with the radiation from the area of radioactive non-uniformity, and compare weight-adjusted magnitudes of radiation for each identified radio-nuclide.

28. The apparatus of claim 27, wherein the assay detector is configured to determine whether the weight-adjusted magnitudes of radiation for each identified radio-nuclide exceeds a predetermined level associated with each identified radio-nuclide.

29. The apparatus of claim 27, wherein the plurality of different radio-nuclides include naturally occurring and/or man-made radio-nuclides.

30. The apparatus of claim 29, wherein the predetermined level of man-made radio-nuclides is lower than the predetermined level of naturally occurring radio-nuclides.

31. The apparatus of claim 29, wherein the predetermined level of man-made radio-nuclides is greater than the predetermined level of naturally occurring radio-nuclides.

32. The apparatus of claim 1, wherein the assay detector is configured to assay radiation by identifying radiation generated by naturally occurring substances having a first allowable limit, identifying radiation generated by man-made substances having a second allowable limit, determining whether the radiation generated by naturally occurring substances exceeds the first allowable limit, and determining whether the radiation generated by man-made substances exceeds the second allowable limit.

33. The apparatus of claim 32, wherein the plurality of different types of radiation comprise alpha, beta, and gamma radiation.

34. The apparatus of claim 32, wherein the identified one of the plurality of different types of radiation emanating from the material comprises gamma radiation.

35. The apparatus of claim 32, wherein the assay detector is configured to detect only one of the plurality of different types of radiation emanating from the material.

36. The apparatus of claim 32, wherein the naturally occurring and man-made substances comprise radio-nuclides.

37. The apparatus of claim 1, wherein the assay detector is configured to assay the radiation by identifying one of a plurality of different types of radiation emanating from the material, identifying a magnitude of the identified type of radiation emanating from the material, and determining total radiation levels for each of the plurality of different types of radiation emanating from the material based on the identified magnitude of the identified type of radiation and a scaling factor associated with the material.

38. The apparatus of claim 1, wherein the support is configured to support a plurality of different materials each associated with a different scaling factor, and the assay detector is configured to identify a magnitude of a type of radiation associated with each of the plurality of different materials, and determine total radiation levels for each of the plurality of different types of materials based on each identified magnitude of each identified type of radiation and the different scaling factor associated with each of the plurality of different materials.

39. The apparatus of claim 1, wherein the assay device is configured to generate a report listing types of radiation expected from a material and relative amounts of radiation associated with each of the listed types of radiation.

40. The apparatus of claim 39, wherein the listed types of radiation comprise alpha, beta, and gamma radiation.

41. A method of assaying material comprising:
providing a device for holding or containing material;
providing a scanning detector for detecting an area of radioactive non-uniformity in the material; and
providing an assay detector for assaying any radiation emanating from the detected area of radioactive non-unformity of the material.

42. The method of claim 41, further comprising moving the scanning detector relative to the device prior to detecting for an area of radioactive non-uniformity.

43. The method of claim 41, wherein the assay detector is a germanium detector.

44. The method of claim 41, wherein the scanning detector is a NaI detector.

45. The method of claim 41, wherein the assay detector is a germanium detector.

46. The method of claim 41, including the additional step of:
weighing the device and material to determine material weight.

47. The method of claim 46, wherein the assay detector is configured to adjust the assay of the radiation based on the determined material weight.

48. The method of claim 46, wherein the assay detector is configured to identify at least one of a plurality of different types of radiation emanating from the material, identify one of a plurality of different limits based on the identified type of radioactivity, and determine whether the identified type of radiation exceeds the identified limit.

49. The method of claim 46, further comprising the step of sliding the scanning detector relative to the device for holding or containing material.

50. The method of claim 49, including the additional step of:
activating a signal upon detection of a radiation level above a predetermined radiation level.

51. The method of claim 49, further comprising the step of mounting the scanning detector to a mobile post slidably engaged in a rail slide system.

52. The method of claim 41, wherein the scanning detector comprises a plurality of scanning detectors.

53. The method of claim 52, wherein the plurality of scanning detectors are movable relative to each other.

54. The method of claim 41, wherein the assay detector comprises a plurality of assay detectors.

55. The method of claim 41, wherein the assay detector is configured to identify one of a plurality of different radio-nuclides associated with the radiation emanating from the detected area of radioactive non-uniformity in the material, and quantify an amount of radiation generated by the identified radio-nuclide.

56. The method of claim 41, wherein the assay detector is configured to analyze an energy spectrum associated with the radiation emanating from the area of radioactive non-uniformity so as to identify one of a plurality of different radio-nuclides.

57. The method of claim 56, wherein the plurality of different radio-nuclides include naturally occurring and/or man-made radio-nuclides.

58. The method of claim 55, further comprising comparing the amount of radiation generated by the identified radio-nuclide with a limit associated with the identified radio-nuclide.

59. The method of claim 58, wherein the comparing step includes determining whether the amount of radiation generated by the identified radio-nuclide exceeds the limit associated with the identified radio-nuclide.

60. The method of claim 41, wherein the scanning detector is arranged to scan a side surface of the device, and the assay detector is arranged to assay radiation emanating from a bottom surface of the device.

61. The method of claim 41, wherein the assay detector is arranged to assay radiation emanating from only a single side of the device.

62. The method of claim 41, wherein the assay detector is arranged to assay radiation emanating from the device while the device moves relative to the support.

63. The method of claim 41, wherein the assay detector is configured to identify at least one of a plurality of different radio-nuclides associated with the radiation from the area of radioactive non-uniformity, identify a magnitude of radioactivity associated with each identified radio-nuclide associated with the radiation from the area of radioactive non-uniformity, and compare weight-adjusted magnitudes of radioactivity for each identified radio-nuclide.

64. The method of claim 63, wherein the assay detector is configured to determine whether the weight-adjusted magnitudes of radioactivity for each identified radio-nuclide exceeds a predetermined level associated with each identified radio-nuclide.

65. The method of claim 41, wherein the assay detector is configured to assay the radiation by identifying one of a plurality of different types of radiation emanating from the material, identifying a magnitude of the identified type of radiation emanating from the material, and determining total radiation levels for each of the plurality of different types of radiation emanating from the material based on the identified magnitude of the identified type of radiation and a scaling factor associated with the material.

66. The method of claim 65, wherein the plurality of different types of radiation comprise alpha, beta, and gamma radiation.

67. The apparatus of claim 65, wherein the identified one of the plurality of different types of radiation emanating from the material comprises gamma radiation.

68. A system for assaying material comprising:

a support for holding a container containing material;

an assay station including a scanning detector proximate to the support to detect an area of radioactive non-uniformity in the material, and an assay detector proximate to the support to assay any radiation emanating from the detected area of radioactive non-uniformity in the material by detecting whether a man-made radio-nuclide is associated with the radiation emanating from the material and determining whether the radiation emanating from the material exceeds a regulated limit for the detected man-made radio-nuclide;

a delivering device configured to deliver the container to the assay station; and a removing device configured to remove the container from the assay station.

69. The system of claim 68, wherein the scanning detector comprises a plurality of scanning detectors.

70. The system of claim 69, wherein the plurality of scanning detectors are movable relative to each other.

71. The system of claim 69, wherein the scanning detectors are NaI detectors.

72. The system of claim 71, wherein the scanning detectors are each mounted on a mobile post slidably engaged in a rail slide system.

73. The system of claim 68, wherein the assay detector comprises a plurality of assay detectors.

74. The system of claim 73, wherein the assay detectors are germanium detectors.

75. The system of claim 68, further comprising a scale in each assay station to weigh the device and material to determine material weight.

76. The system of claim 68, further comprising:

a signal for signaling that a predetermined radiation level has been reached.

77. The system of claim 68, further comprising a plurality of assay stations, each assay station having different numbers of scanning and assay detectors for assaying different sized devices.

78. The system of claim 68, wherein the assay detector is configured to determine whether a first portion of the radiation is associated with a naturally occurring source and whether a second portion of the radiation is associated with a man-made source.

79. The system of claim 78, wherein the assay detector is configured to determine whether the first portion of the radiation exceeds a first regulated limit associated with the naturally occurring source, and determine whether the second portion of the radiation exceeds a second regulated limit associated with the man-made source.

80. The system of claim 79, wherein the assay detector is configured to assay radiation emanating from the detected area of radioactive non-uniformity of the material.

81. The system of claim 79, further comprising a weight measuring device for determining a weight of the container of material, and wherein the assay detector is configured to determine whether t first portion of the radiation exceeds a first regulated limit associated with the naturally occurring source based on the weight of the container of material, and determine whether the second portion of the radiation exceeds a second regulated limit associated with the man-made source based on the weight of the container of material.

82. The system of claim 80, wherein the removing device is configured to remove the area of radioactive non-uniformity from the container when the assay detector detects that the second portion of the radiation exceeds the second regulated limit associated with the man-made source.

83. The system of claim 80, wherein the removing device is configured to remove the area of radioactive non-uniformity from the container when the assay detector detects that the first portion of the radiation exceeds the first regulated limit associated with the naturally occurring source.

84. The system of claim 68, wherein the assay detector is configured to identify one of a plurality of different types of radiation emanating from the material, identify a magnitude associated with the identified type of radiation, and provide a listing of total radioactivity levels for each of the plurality of different types of radiation emanating from the material based solely on the identified one type of radiation and a scaling factor associated with the container of material.

85. The system of claim 84, wherein the assay detector is configured to identify gamma radiation.

86. The system of claim 84, wherein the plurality of different types of radiation emanating from the material include alpha, beta and/or gamma radiation.

87. A system of assaying radiation emanating from a container of material comprising:

a support configured to support the container of material;

a radiation detector configured to detect radiation emanating from a side surface of the container of material; and an assay detector configured to assay different types of radiation emanating from only a bottom surface of the container of material so as to determine whether an amount of radiation of each type of radiation exceeds a regulated limit for each type of radiation.

88. The system of claim 87, wherein the regulated limited corresponds to an evaluated and regulated dose limit.

89. The system of claim 87, further comprising a signaling device configured to provide a signal if the amount of radiation of each type of radiation exceeds the regulated limited for each type of radiation.

90. The system of claim 87, wherein the radiation detector is configured to detect a hot spot of the container of material, and the assay device is configured to assay different types of radiation emanating from the detected hot spot of the container.

91. The system of claim 87, wherein the radiation detector and the assay detector are arranged to detect and assay radiation emanating from the container of material while the radiation detector moves relative to the container.

92. The system of claim 87, wherein the assay detector is configured to detect radiation emanating from only the bottom surface of the container of material while the radiation detector moves relative to the container.

93. The system of claim 87, wherein the radiation detector and the assay detector each comprise a series of interconnected sensors spaced apart from one another for sensing radiation emanating from different locations of the container of material.

94. The system of claim 87, wherein the radiation detector and the assay detector are configured to move relative to the container of material.

95. The system of claim 87, wherein the assay detector is configured to distinguish between radioactivity caused by man-made radio-nuclides and radioactivity caused by naturally occurring radio-nuclides.

96. The system of claim 95, wherein the assay detector is configured to quantify different amounts of radioactivity relative to whether the radiation is caused by man-made radio-nuclides or naturally occurring radio-nuclides.

97. The system of claim 96, wherein the assay detector is configured to compare the quantified amounts of radioactivity to a regulated limit for each of the man-made and naturally occurring radio-nuclides.

98. The system of claim 87, further comprising a weighing device arranged to weigh the container of material supported by the support, and the assay device is configured to calibrate the assay of radiation based on the weight of the container of material.

99. The system of claim 87, wherein the assay detector is configured to detect only gamma radiation, and determine relative amounts of alpha and beta radiation based on the detected gamma radiation and a scaling factor associated with the container of material.

100. A system for assaying a plurality of products comprising:
a support for sequentially supporting each of the plurality of products to be assayed; and
an assay device configured to sequentially assay radiation emanating from each of the products by distinguishing radiation generated by naturally occurring substances having a first allowable limit from radiation generated by man-made substances having a second allowable limit, determining whether the radiation generated by naturally occurring substances exceeds the first allowable limit, and determining whether the radiation generated by man-made substances exceeds the second allowable limit.

101. The system of claim 100, further comprising a radiation detector for detecting radiation emanating from each of the plurality of products.

102. The system of claim 100, wherein the plurality of products comprise a plurality of different types of waste material.

103. The system of claim 100, further comprising a weight measuring device configured to measure a weight of each of the products, and wherein the assay device is configured to determine whether the radiation generated by naturally occurring substances and the radiation generated by man-made substances exceed the first and second allowable limits, respectively, based on the measured weight of each of the products.

104. The system of claim 100, wherein the assay device is configured to identify a magnitude of gamma radiation emanating from each of the naturally occurring and man-made substances.

105. The system of claim 104, wherein the assay device is configured to calculate alpha and beta radiation levels based on the identified magnitude of gamma radiation and one of a plurality of scaling factors associated with each of the products.

106. A method for assaying material comprising:
supporting a container of material to be assayed;
scanning the container to detect an area of radioactive non-uniformity in the material;
determining whether a portion of radiation emanating from the material is generated by a naturally occurring substance having a first allowable limit;
determining whether a portion of the radiation emanating from the material is generated by a man-made substance having a second allowable limit;
calculating whether a magnitude associated with the portion of the radiation generated by the naturally occurring substance exceeds the first allowable limit; and
calculating whether a magnitude associated with the radiation generated by the man-made substance exceeds the second allowable limit.

107. The system of claim 106, wherein the first and second allowable limits correspond to an evaluated and regulated dose limit.

108. The method of claim 106, wherein the steps of determining include identifying a type of radio-nuclide associated with the radiation emanating from the material.

109. The method of claim 106, wherein the steps of determining include assaying radiation emanating from the detected area of radioactive non-uniformity of the material.

110. The method of claim 109, further comprising removing the area of radioactive non-uniformity from the container when the magnitude associated with the portion of the radiation generated by naturally occurring substances exceeds the first allowable limit.

111. The method of claim 109, further comprising removing the area of radioactive non-uniformity from the container when the magnitude associated with the portion of the radiation generated by man-made substances exceeds the second allowable limit.

112. The method of claim 106, further comprising determining a weight of the container of material, and wherein the steps of calculating include adjusting the magnitude associated with the radiation generated by the naturally occurring and man-made substances based on the measured weight of the container.

113. The method of claim 112, wherein the step of identifying one of a plurality of different types of radiation emanating from the material comprises identifying gamma radiation, and the plurality of different types of radiation include alpha, beta, and gamma radiation.

114. The method of claim 106, further comprising identifying one of a plurality of different types of radiation emanating from the material, identifying a magnitude associated with the identified type of radiation, and providing a listing of total radioactivity levels for each of the plurality of different types of radiation emanating from the material based solely on the identified one type of radiation and a scaling factor associated with the container of material.

115. A method of assaying material comprising:

providing a device for holding or containing material;

detecting for an area of radioactive non-uniformity in the material with a scanning detector;

sliding the scanning detector relative to the device for holding or containing material;

activating a signal upon detecting of a radiation level above a predetermined radiation level;

assaying any radiation emanating from the material with an assay detector; and ceasing movement of the scanning detector upon signal activation, thereby indicating an area of radioactive nonuniformity in the material.

116. A method of assaying material comprising:

providing a device for holding or containing material;

detecting for an area of radioactive non-uniformity in the material with a scanning detector;

assaying any radiation emanating from the material with an assay detector; and retrieving a quality control sample from the material and assaying the quality control sample.

\* \* \* \* \*

UNITED STATES PATENT AND TRADEMARK OFFICE
CERTIFICATE OF CORRECTION

PATENT NO.    : 6,448,564 B1
DATED         : September 10, 2002
INVENTOR(S)   : Alfred N. Johnson et al.

It is certified that error appears in the above-identified patent and that said Letters Patent is hereby corrected as shown below:

Column 14,
Line 8, "claim 41" should read -- claim 44 --.

Column 15,
Lines 7-8, "radiactivity" should read -- radioactivity --.

Column 16,
Line 22, "whether t" should read -- whether the --.
Line 64, "limited" should read -- limit --.

Column 17,
Line 2, "limited" should read -- limit --.

Signed and Sealed this

Twenty-third Day of March, 2004

JON W. DUDAS
*Acting Director of the United States Patent and Trademark Office*